June 16, 1953        R. S. BURNETT        2,642,136
VENEER CUTTING MACHINE
Filed April 26, 1948        7 Sheets-Sheet 1
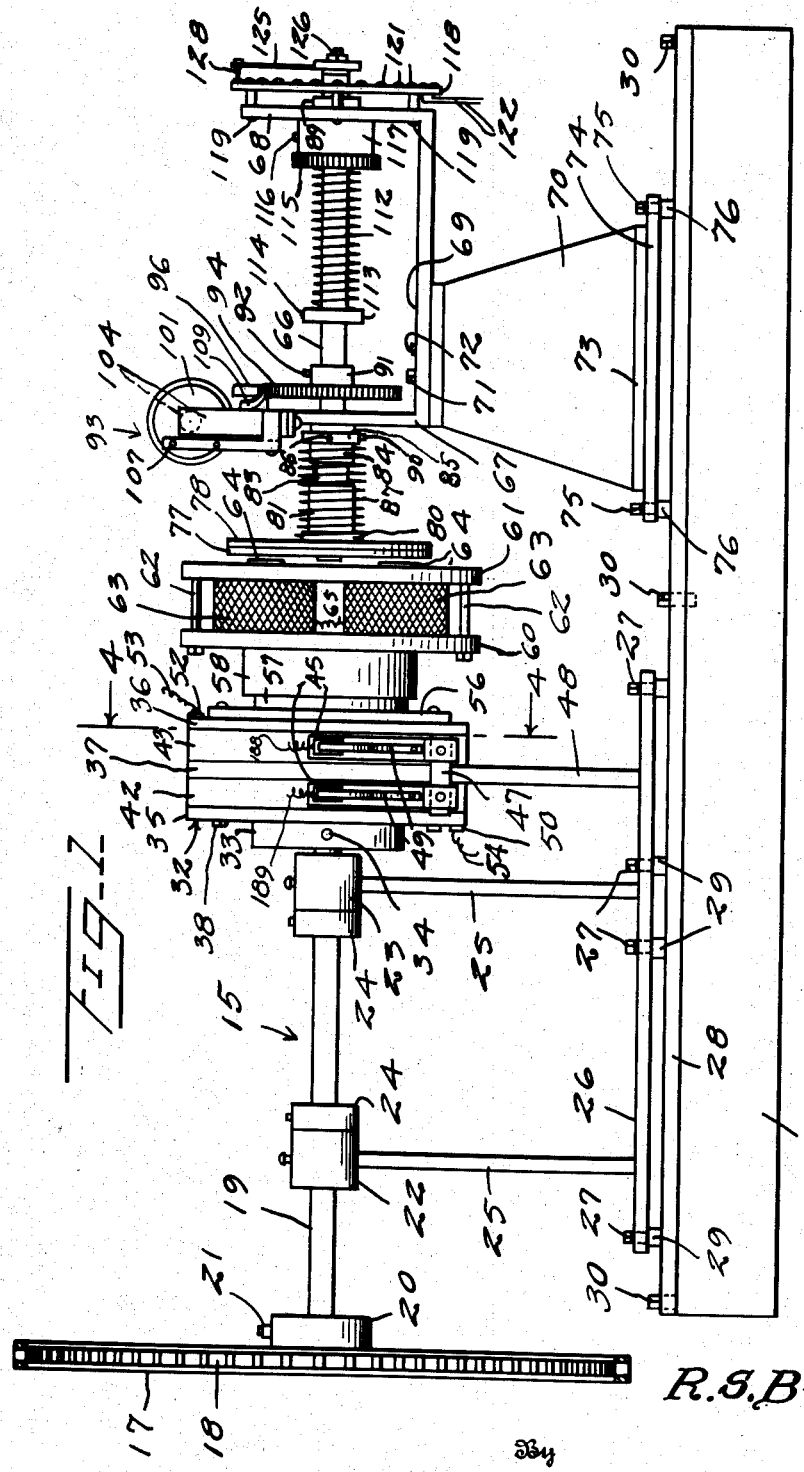
Inventor
R. S. Burnett
By
Kimmel & Crowell Attys.

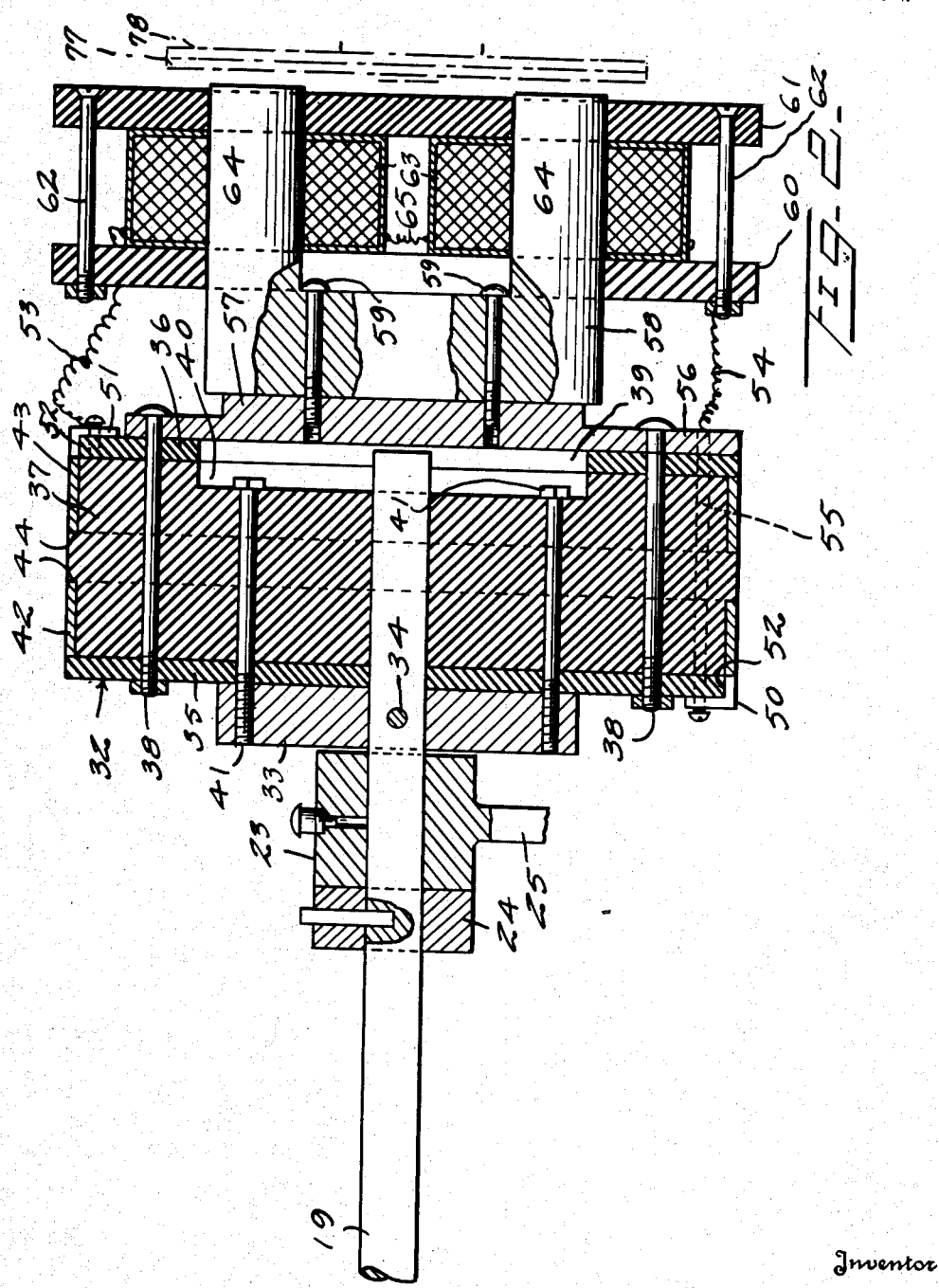

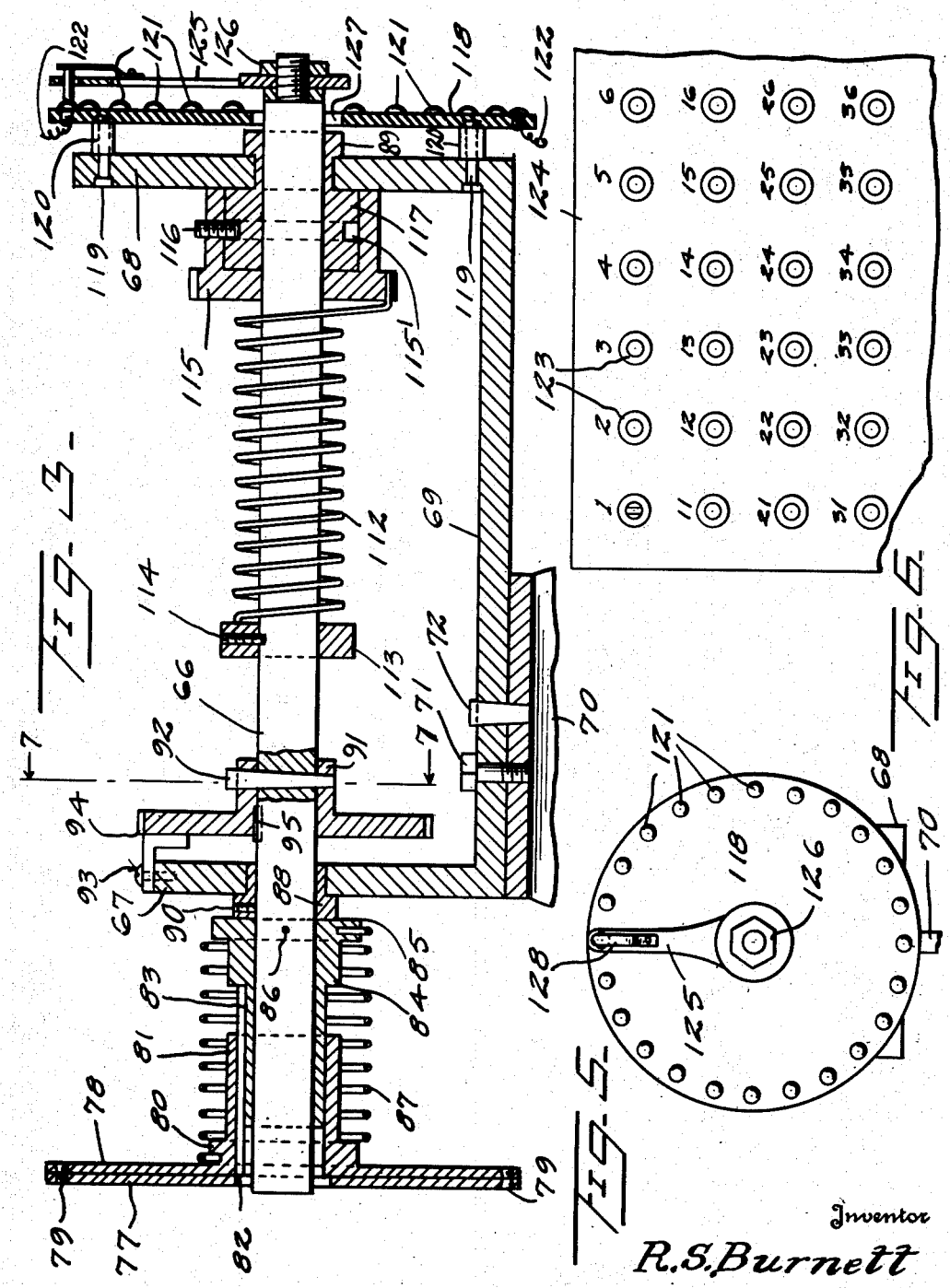

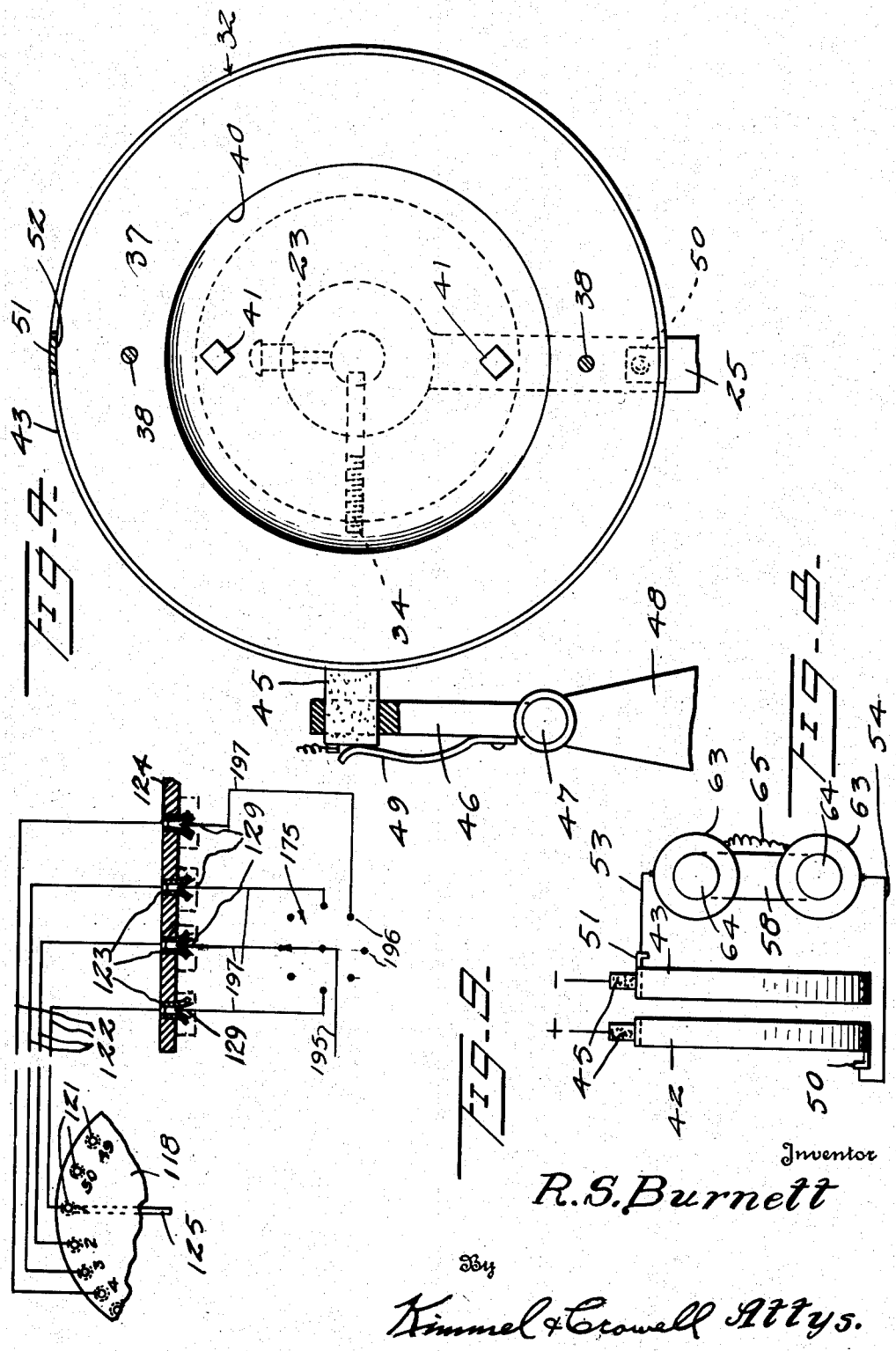

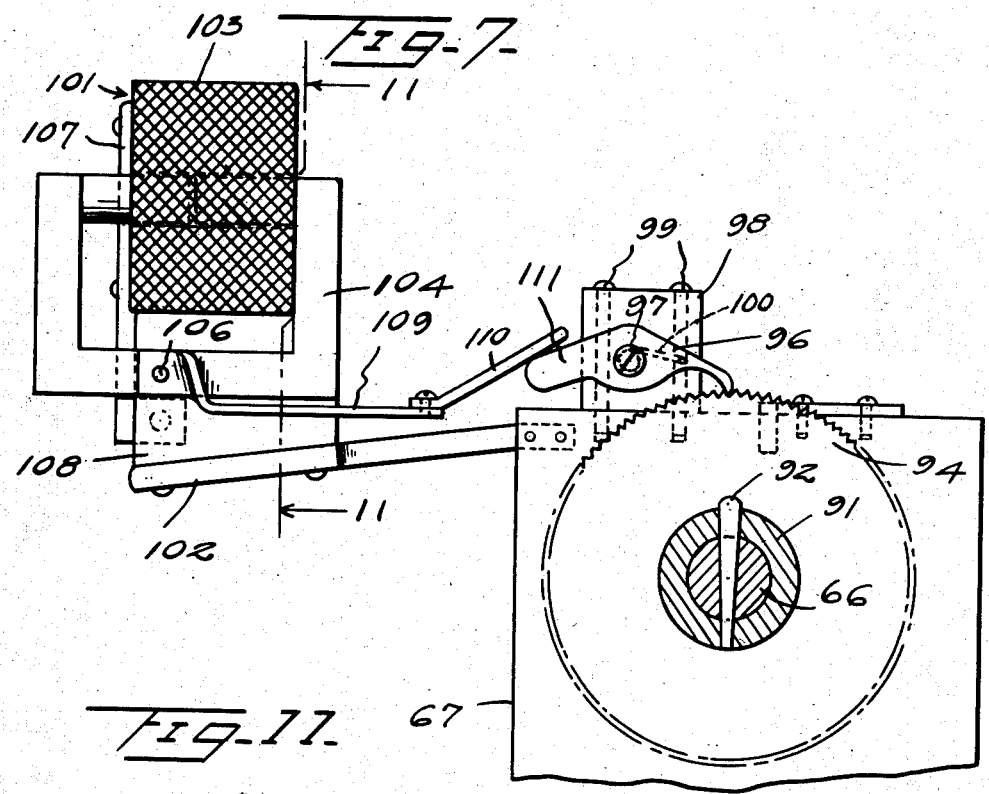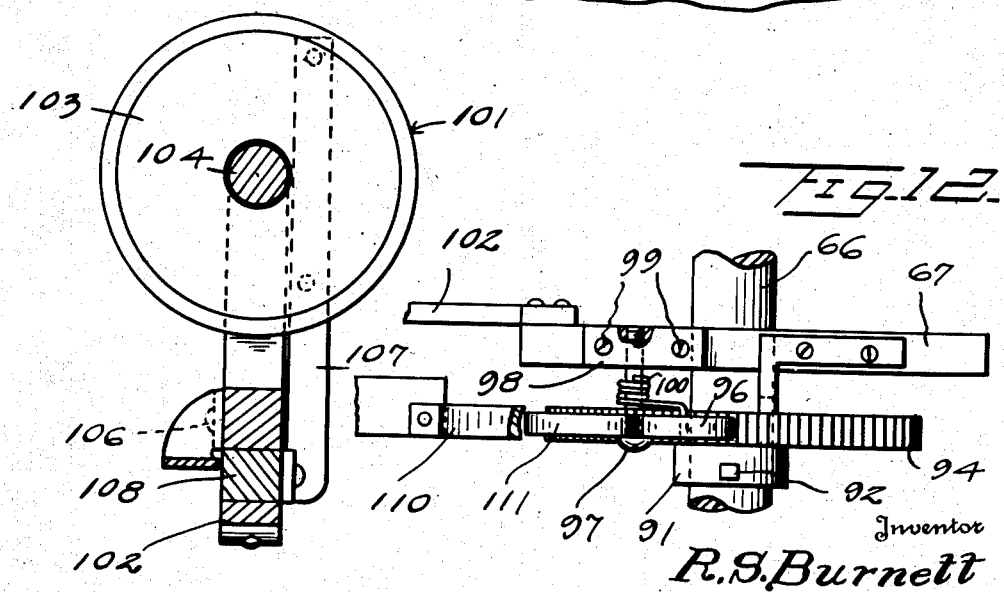

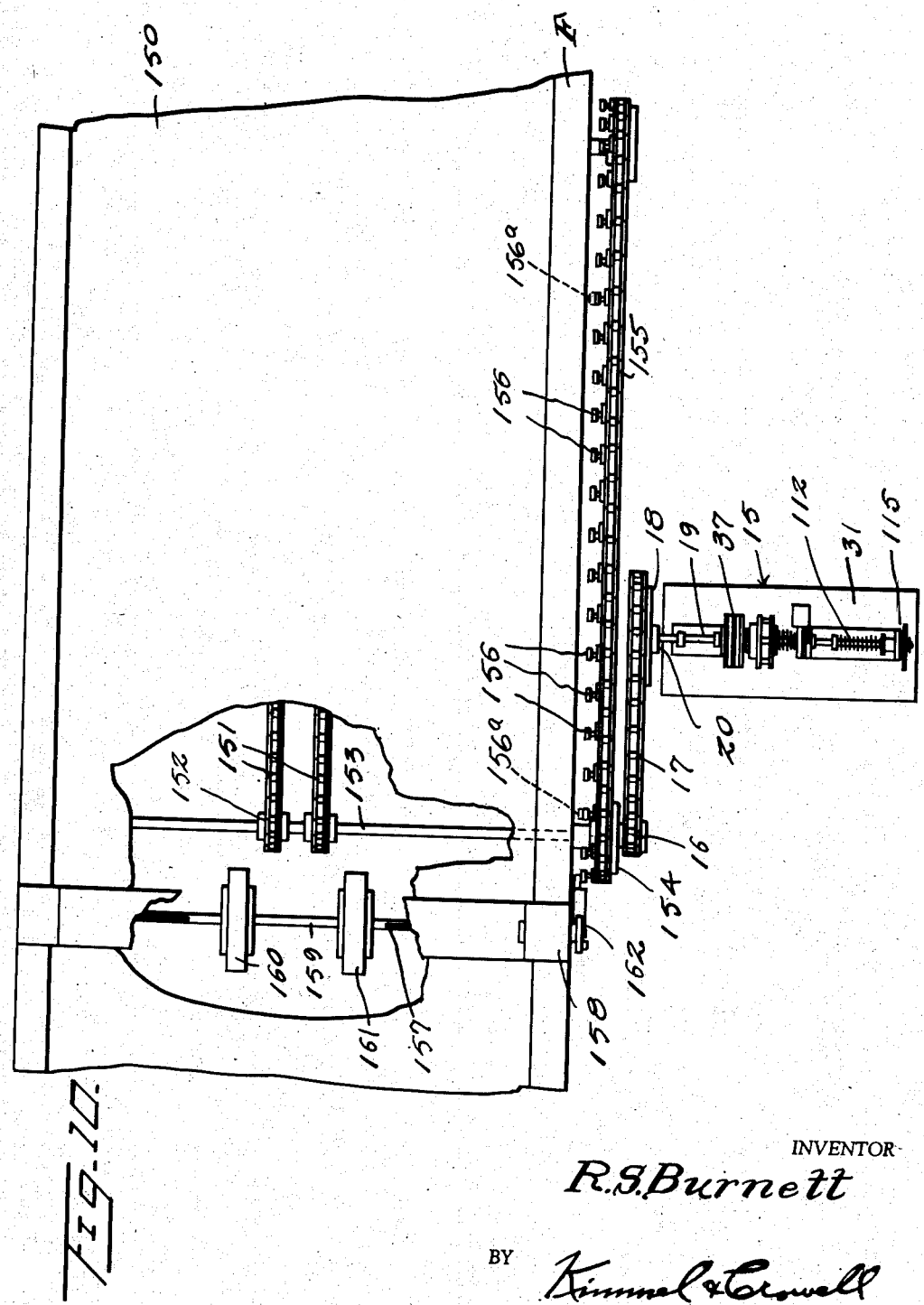

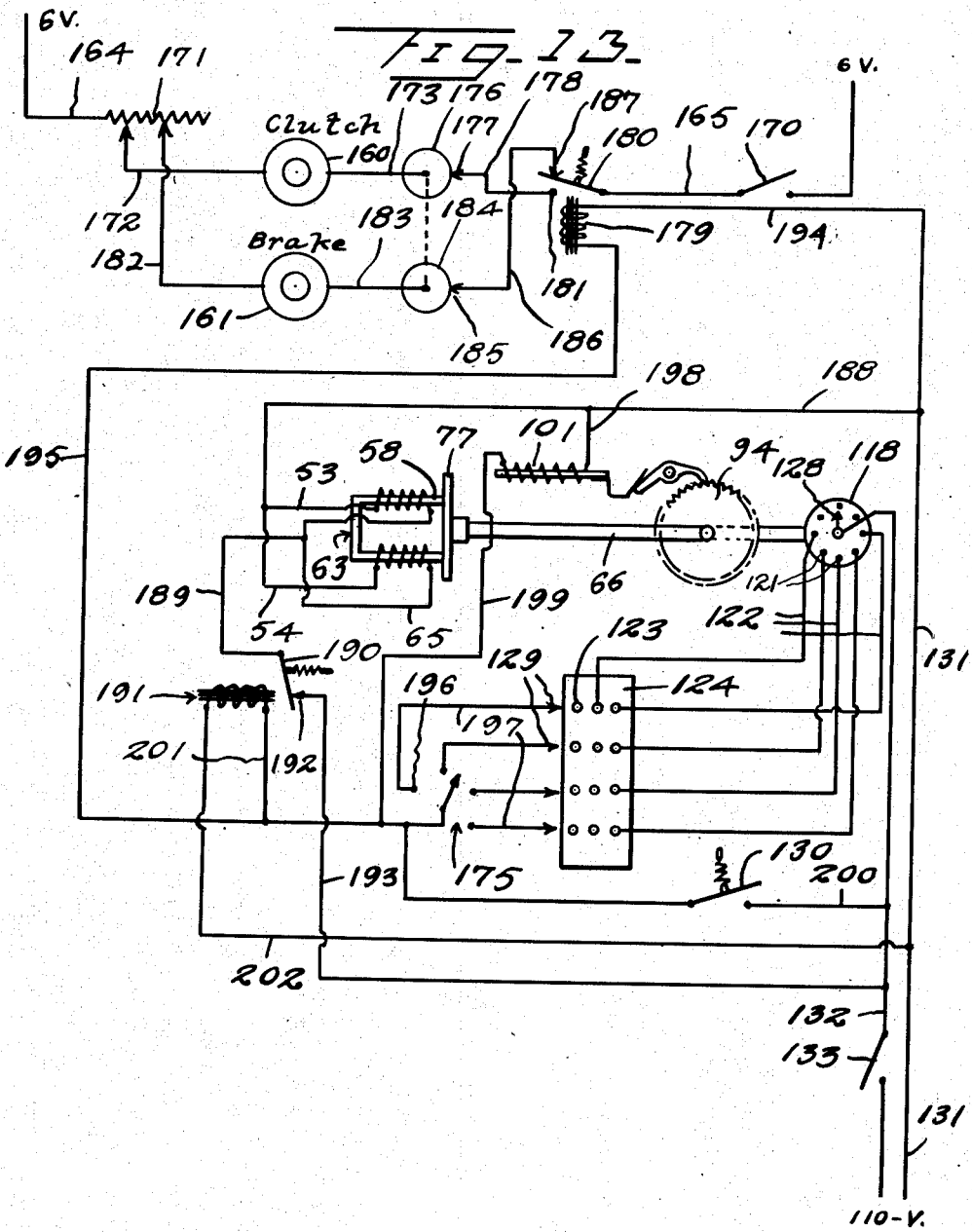

Patented June 16, 1953

2,642,136

UNITED STATES PATENT OFFICE 2,642,136

VENEER CUTTING MACHINE

Rudolph S. Burnett, Memphis, Tenn.

Application April 26, 1948, Serial No. 23,275

3 Claims. (Cl. 164—48)

My invention has reference to veneer stripping and clipping machines and more particularly to a control means, timing or space measuring device or machine for veneer stripping and clipping machines, for cooperative association with the veneer or strip clipper or cutter of the clipping machine or clipper part thereof to cause automatic clipping or cutting off of the veneer, strip or sheet in predetermined regular or irregular lengths.

An object of the invention is to provide a control means, timing or space measuring device adapted for use with conventional veneer stripping and clipping machines in direct association with the clipper part of a machine so as to cause automatic clipping or cutting off of the veneer, strip or sheet in predetermined or required lengths and to greatly facilitate and simplify the work and reduce the time and attention required of the operator in operating the clipping unit or cutting knife to cut the veneer or sheet in the required lengths automatically without checking, slowing down or stopping the advance or feeding movement of the veneer, whereby the constant attention of the operator and his engagement in measuring, using a measuring stick or operating the measuring devices or switches for each length of veneer to be cut is eliminated, thus making it possible for him to give attention to the inspection of the veneer or sheet material. In view of such automatic control provided hereby the operator is provided ample time for manual control in the elimination or cutting out of defective portions from the veneer strip as where knots or holes occur, thereby overcoming many of the objections to present machines or devices in which it is impractical, if not impossible, to give attention to the inspection of the veneer or sheet material since they allow little or no time for special attention to strip inspection on the part of the operator due to the necessity of constantly measuring the lengths of the material by determining the distance between the switches in order to operate the same so that the proper switches may be closed for cutting the veneer or strip material in the required lengths.

Another object of the invention is to provide a control means, timing or space measuring device for the clippers of veneer stripping and clipping machines by which when the device is set, the veneer or strip will be cut in the required or uniform lengths except when changes for non-uniform lengths cut are necessary or when non-uniform lengths are to be cut for the elimination of defective sections or portions of the material or veneer; thereby freeing the operator for inspection and elimination of such defective portions of the veneer or sheet, without interfering with the resumption of the operation of automatic measuring and clipping, or cutting of the veneer into any desirable lengths for which the present control, timing or space measuring means is set to operate electrically.

Another object is to provide a control, timing or space measuring means as a mechanical and electrical improvement for a conventional veneer stripping and clipping machine wherein a veneer strip is carried along a path of travel by a continuous belt with a rotary shaft rotated in concurrent relation to the travel of the belt.

Machines of this type customarily have a lathe on which the log or block is placed and stripped to convert it into veneer, strip or sheet material which is rolled onto a spool or fed directly into the clipper. If wound on a spool, the spool is elevated and the veneer unwound therefrom and rolled over a platform of belts until it reaches the clipping or cutting knife.

Another object is to provide a simple, manually operated or set automatic electrical control means for timing or measuring the lengths of the sheet or strip material or veneer being run through the clipper before being cut, clipped off or severed from the strip and the automatic intermittent actuation of the clipper or cutting knife thereof for successively cutting uniform lengths regular or variable lengths without requiring the attention and aid of the operator after once having been set, unless a setting or adjustment for cutting different lengths or a short length of defective strip material or veneer is required, as compared with that for which the device has once been set, thereby permitting the setting for cutting different lengths in a simple and efficient manner.

Another object is to provide an automatic device which frees the operator for the work of inspection of the sheet or strip as it moves to the clipper and permits the use of the cutter control means and switches for operating the cutter when defective material appears so that a required or short length of such material may be eliminated, thrown off or cut out by two cuts usually closely related as determined by the defect or at each end thereof, and then to take up and resume or continue the automatic cutting operation.

A further object is to permit the device to be readily and easily set to cut off the material in any desired uniform or regular lengths and to electrically cause automatic operation of the cutter at such points or times and automatic repeating thereof instead of requiring the operator to repeatedly set the controls and switches for the initial and each subsequent operation of the cutter or clipper to cause severance of the strip or veneer.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a side elevation of the control means, timing or space measuring device for veneer stripping and clipping machines, embodying my invention.

Figure 2 is an enlarged fragmentary sectional elevation of a part of the left hand portion of the device as shown in Figure 1.

Figure 3 is a view similar to Figure 2, of the right hand portion of the device as shown in Figure 1.

Figure 4 is an enlarged vertical section taken on the line 4—4 of Figure 1.

Figure 5 is a fragmentary end elevation of the contact dial or disc and arm looking toward the left in Figure 1.

Figure 6 is an elevation of a portion of a bus or switch board by which jack or other switches are plugged in to connect any two of the series of contacts for causing the closing of an electrical circuit and operation of the clipping or cutting knife automatically according to the length of veneer or strip material to be cut.

Figure 7 is a fragmentary sectional elevation of the means for checking the operation of the movable contact when the desired length of material has passed and reached the clipping or cutting knife to cause operation thereof and subsequent return of the movable contact to its initial position for repetition of the cutting operation and automatic severing of the material repeatedly in the required lengths.

Figure 8 is a diagrammatic detail of a portion of the electrical circuit for causing distribution of the current to a magnetic clutch to drive the movable contact and de-energization of the clutch to cause release of the driving connection and return of the movable contact to its initial position.

Figure 9 is another diagrammatic view of the electrical circuit showing the connections between the switch board and the circular series of stationary contacts with which the movable contact cooperates to cause the automatic intermittent operation of the clipper or cutting knife thereof.

Figure 10 is a plan view partially broken away showing the application and relative position and location of the present control means, time or space measuring device to the clipper of a conventional veneer stripping and clipping machine.

Figure 11 is a sectional view taken along the line 11—11 of Figure 7 as viewed in the direction indicated by the arrows.

Figure 12 is a top plan view of the checking means or limiting stop shown in Figure 7.

Figure 13 is a diagram of the electrical circuit of the clipper of the main machine and the present control device.

Referring to the drawings and especially to Figure 10, the present control means, time or space measuring device for veneer stripping and clipping machines is designated generally at 15 and is mounted on a horizontal platform or table 31 constituting a base or support mounted on the floor or otherwise, adjacent and alongside of the main machine frame F of a conventional type.

The shaft 159 is caused to revolve by the engagement of the electro-magnetic clutch 160 upon energization of the circuit through the actuating switch 162. When this happens, electromagnetic brake 161 is in turn energized and this checks or momentarily stops further rotation of shaft 159. However, there is no appreciable delay or any stopping or slowing down of the feed of the veneer sheet or strip and without any substantial buckling or humping up during such delay in the movement of the veneer under and passing the clipper and without clipper knife 157 being in a downward position across the path of the veneer sheet when the operation is stopped for any reason, since at the completion of the stroke of the knife the latter is in an upward or raised position as is conventional practice. The effect is a quick jab-like cutting, the switching from clutch 160 to brake 161 being done by the timing device 163 which may comprise a circular disc of known construction with two semi-circular brushes, one to impart and carry electrical current energy to the clutch and the other to the brake. The electrical current is carried to the disc for distribution as set forth, by the manual operation of the push knobs or switches 156 on the endless member chain or belt 155, the moving belt before the operation of the conventional clipping or cutting unit having nothing to do with the lathe which strips the veneer from the log or block. In the conventional veneer machine the series of spaced knobs or electric switches 156 are spaced two inches apart so that the operator can make a selection of lengths into which the veneer is cut by multiples of two inches. This he does by moving a selected knob to a switch engaging position as shown at 156a and moving a second knob spaced a predetermined distance from the first positioned knob, for instance the 16th knob from the first one which has been positioned, to cut the veneer in 32 inch long pieces, sections or length, or of course, any other desired pair and spacing of knobs according to the lengths to be cut.

The two knobs hit actuating switch 162 and by operating the same, distribute and cut off the current to electro-magnetic clutch 160 and brake 161 successively and intermittently while the veneer is moving and passing beneath the clipper or cutting knife 157 through the medium of the conventional timing and current distributing device or disc. The two knobs or switches, i. e. contacts 156, after passing the cutting or clipping machine or knife 157 are repositioned so as not to engage switch 162 by conventional means, not shown, so that the operator must press down two more knobs 156 to repeat the cutting operation and these travel and do their work. Thus, the operator of the conventional machine with such a manually controlled device is engaged constantly in measuring the distances between or spacing of the pairs of knobs and positioning them according to the lengths of the sections or pieces into which the veneer strip or sheet is to be cut with a repeat of the operation for each cut, and being so busily engaged, he has little or no time for inspection of the material or elimination of defective portions such as contain knots, holes or other defects.

The present invention is designed to eliminate such measuring and positioning of knobs by causing the automatic control, space or time measuring and cutting of regular lengths of veneer without repetition of the selection of spacing once the same has been selected or set, it being noted that the repeated manually measuring or selection and positioning of the knobs is a tedious job which does not permit much time for inspection of material for defects and special selection of knobs 156 for elimination or cutting out of defective portions. The present device automatically measures off the desired lengths, such as the 32 inches referred to, energizes the timing device or distributing disc for the current to the electromagnets of the clutch 160 and brake 161, or any other desired length, and when such length of material has passed, energizes the disc which in its rotation distributes the current to the clutch and brake operating magnets and causes the cutting operation to be regularly effected by operation of the clipper knife without any further effort or aid of the operator, thereby freeing the operator for the work of inspection and looking out for defects in material which should be eliminated, permits the operator to throw it off, press a button by hand when a defect is observed and when the required short length of material or veneer to embrace or include the defect such as 4 or 6 inches has moved or travelled, press another or second button, and by operating the clipper each time or twice such short distances apart or any other distance in multiples of two inches apart, cut out and eliminate defective material which may contain knots or holes, or be otherwise defective, and having done this, the present device will be back in position ready to take up and resume its automatic operation of controlling, timing or space measuring to cause automatic cutting of the veneer strip or sheet in regular lengths without repeated measuring of spacing between buttons and operation thereof by the operator manually.

The advantages of the present device and such automatic operation are therefor apparent and real and better material can be put out, the tedium of having to repeatedly reset the spacing means is eliminated and the output of the main machine is substantially increased.

The shaft 19 is journaled in bearings 22 and 23 of any suitable type, anti-friction or otherwise, with provision for lubrication and held by collars 24 suitably set or fixed on the shaft at opposed sides of said bearings to take end thrust and prevent axial translation or shifting. Bearings 22 and 23 are supported on frame uprights or pedestals 25 on a plate 26 bolted adjustably or otherwise as by screws 27 to and over one end portion of a second lower plate 28 with interposed spacers or spacing collars 29, while plate 28 is supported on and bolted at 30 to and over the full length of a base 31 forming the platform or table suitably supported as from the floor alongside the main machine frame F of the stripping and clipping machine. Adjacent bearing 23, shaft 19 carries a fiber wheel or current distributor 32 fixed to the shaft 19 in any suitable manner, as by a set screw 34 through its hub or hub plate 33. Wheel 32 has fiber discs or end plates 35 and 36 bolted to a relatively wide insulation or fiber disc or cylinder 37 and to each other as at 38, and plate 36 is provided with an opening 39 and disc 37 with a recess 40 at the inner end of shaft 19 in the base of which bolts 41, accommodated in opening 39 and recess 40 connect the same and hub 33 through disc or plate 35. Copper slip rings 42 and 43 are mounted in spaced relation in grooves 44 formed in the periphery of the fiber or insulation disc 37 and these rings are engaged by carbon brushes or contacts 45 carried by arms 46 supported or pivoted at 47 on an upright brush holder 48 to move toward and away from rings 42 and 43. Brushes 45 slide horizontally through arms 46 and are held against the slip rings by springs 49. Rings 42 and 43 have tongues or clips 50 and 51 extended laterally or bent therefrom formed in the recesses 52 in fiber discs or plates 35 and 36, respectively at opposite sides of the wheel 32 to which conductors 53 and 54 are connected with conductor 54 extended through an opening 55 in the wheel 32.

A plate 56 is bolted at 38 against disc or plate 36 and has a thickened central portion or extension 57 to which a horseshoe magnet core 58 is bolted as at 59. A pair of fiber plates 60 and 61 are bolted or connected in spaced relation as at 62. The joined plates 60 and 61 are mounted on core 58 with interposed coils or windings 63 disposed on the legs 64 of the magnet or core to which conductors 53 and 54 are connected and to each other at 65. The plates 60 and 61 are formed with aligned holes receiving the legs 64 which are extended and exposed at and slightly beyond the outer face of plate 61.

A second shaft or shaft section 66 is journaled in upright bearing members, arms or end plates 67 and 68 of a U-shaped bearing frame 69 disposed on a pedestal 70 with said frame being bolted and keyed thereto as at 71 and 72, respectively. The base 73 of pedestal 70 is welded or otherwise secured to a base plate 74 which is in turn bolted at 75 to plate 28 and base 31 with the pedestal base 74 being separated from the main base by interposed spacers or spacing collars as at 76, the same as plate 26 is bolted thereto. Slidably mounted on the end of the shaft 66 adjacent the electro-magnet and ends of legs 64 of core 58 is a magnetically sensitive centrally apertured clutch plate or disc and armature 77 having an insulation or fiber disc backing 78 secured thereto in any suitable manner as indicated by rivets as at 79. The backing member 78 is provided with a central hub 80 and sleeve 81 open at the front to expose the adjacent end of shaft 66 which is adapted to extend therethrough. Clutch armature 77 is fixed against rotation on the shaft 66 to rotate therewith, but is splined on the shaft as indicated at 82 to permit the armature clutch plate to rotate with and move axially on the shaft 66. The sleeve 81 constitutes a part or section of a two-part telescopic and extensible member including an inner sleeve 83 on which the sleeve 81 is splined or keyed against turning but adapted to slide or shift with limited movement longitudinally or lengthwise by reason of interfitting key or rib and keyway or groove on the respective tubular sections or sleeves. Sleeve 83 is provided with an enlargement 84 and an annular end flange 85 fixed to shaft 66 at 86. A coiled clutch spring 87 is disposed in encircling relation over said sleeves with one end anchored to hub 80 and the opposite end disposed over shouldered enlargement 84 and secured to flange 85. The spring 87 is proportioned to normally space armature 77 free of magnet 58 and engageable therewith against the urge of spring 87 on energization of the magnet as hereinafter explained. Shaft 66 in bearings, bearing collars or bushings 88 and 89 is rotatably mounted in bearing members 67 and 68. These bearings may be fixed or loose on the shaft 66 or in said members, and when bearing or sleeve 88 is fixed to the shaft as by dowel pin or set screw 90, as seen in Figure 3, it acts as a take up and prevents undesired end movement of the shaft.

Mounted on shaft 66 adjacent bearing or bushing 88 and spaced from upright members 67 is a toothed disc or ratchet wheel 94 formed with a collar portion 91 and fixed to the shaft 66 as by a dowel pin 92. The ratchet wheel 94 is engaged by a dog or pawl 96 pivoted by an outstanding horizontal stud 97 carried by a clamp block or bearing 98 bolted at 99 on arm 67 near one side and a torsional spring 100 is fixed to the block or pivot shaft and pawl or dog 96 to hold the latter engaged with the peripheral teeth of the ratchet wheel to permit stepped rotation thereof in one direction and restrain reverse rotation thereof. A small electro-magnet or solenoid 101 is carried by an arm 102 fixed to the arm 67 and projecting laterally outwardly and downwardly on an incline therefrom. The coil or winding 103 of the solenoid is apertured to receive a C-shaped or open looped core 104 constituting a shiftable or movable armature or transfer member mounted at 106 in a bracket or hanger 107 all mounted on arm 67 of frame 69. Core 104 has a plunger or outwardly inclined block 108 at the bottom seated on an inclined arm 102 and with the core having a horizontal inward extension or arm 109 with an inclined abutment member or arm 110 on its inner end to engage the outer end or arm 111 projecting from the dog or pawl 96 opposite the end which engages the teeth of the disc or ratchet wheel 94.

Pawl or dog 96 under the action of the spring 100 is normally held engaged with the teeth of the ratchet wheel, but upon energization of the solenoid, the core or armature and plunger are magnetically attracted and shifted inwardly to force the inclined abutment member or arm 110 against the outer end or arm 111 of the pawl and disengage the same from the ratchet teeth whereby the shaft 66 may turn a predetermined degree or limited extent until the solenoid is deenergized and the core and plunger moved outwardly to release the pawl or dog and permit the spring thereof to rock the pawl into engagement with the ratchet teeth and check further rotation of the ratchet wheel 94 and shaft 66. The spring urged action of pawl 96 is effective to stop any tendency of the said pawl to rebound or bounce at the end of its operating cycle so as to prevent undesired repetitious operation and closing of the electrical circuit to the electro-magnet 160 which operates the clipper shaft and blade, thereby preventing any possibility of accidental operation of the clipper which would waste an inch or so of the veneer or other strip of material being intermittently cut or severed into the desired regular lengths automatically, as compared with the use of an ardinary arm and adjustable stop to check the rotation thereof causing rebound and repeat of the cutting operation, especially in cutting long lengths of material when the shaft and arm tend to pick up momentum, all of which will be more fully described hereinafter.

A torsional reset coil spring 112 has one end anchored to a collar 113 adjustably fixed at one end as by a set screw 114 to shaft 66 and at the other end to a flanged collar or toothed sleeve 115 having a peripheral groove 115' engaged and adjustably held by a set screw 116 to a collar or extension 117 of bearing 89 for setting the adjustment of the tension of the torsional reset spring 112. A stationary insulation or fiber contact disc 118 is bolted at 119 to upright frame member 68 with interposed spacing collars 120 and bears a circular series of spaced contacts 121 each connected by a conductor 122, plug-in connectors or jack switch socket of a regular series 123 thereof mounted in a jack panel or bus board 124 mounted in a convenient place for operation. There may be 50, more or less, of the jack switch sockets or the like in the series 123, preferably uniformly spaced in rows as seen in Figure 6 of the drawings. A movable rotatable contact arm 125 is fixed at 126 to the end of shaft 66 which projects loosely through an opening 127 in the disc 118 to rotate free and out of electrical contact with the stationary contact disc 118, and arm 125 has a contact point 128 to engage contacts 121 in sweeping over the same.

In Figure 13 there is disclosed the circuit diagram by means of which automatic operation of the clipper is obtained. A low voltage clutch and brake circuit is provided which includes conductors 164 and 165 connected to a source of current supply such as a six volt current supply. Conductor 164 is connected to a resistance 171 and a conductor 172 connects resistance 171 to one side of the clutch 160. The other side of the clutch 160 is connected by a conductor 173 to a circular contact 176, which is engaged by a brush 177.

A conductor 178 connects brush 177 to a relay switch 179 having an armature 180, which is normally disengaged from a contact 181 with which conductor 178 is connected. Armature 180 is connected to conductor 165, and a manual switch 170 is interposed in conductor 165 for regulating the manual closing or opening of the low voltage circuit.

Brake 161 is connected at one side by means of a conductor 182 to resistance 171 and the other side of brake 161 is connected by a conductor 183 to a rotatable contact ring 184, which is fixed relative to ring 176.

A brush 185 engages ring 184 and is connected by means of a conductor 186 to a contact 187, which is normally engaged by armature 180 so that normally the brake 161 is in braking position. Conductor 53, which is connected to one end of the coil of magnet 63, is connected by conductor 188 to conductor 131 which is connected to another source of current supply, such as a 110 volt current supply. The other side of the coil of magnet 63 has a conductor 189 connected thereto which is connected to the armature 190 of a relay 191. Relay 191 is connected by a conductor 201 to conductor 195 and by a conductor 202 to conductor 131. Armature 190 normally engages a contact 192 which is connected by a conductor 193 to conductor 132, and conductor 132 has a cutoff switch 133 interposed therein.

Relay 179 has one side thereof connected by means of a conductor 194 to conductor 131, and the other side of relay 179 is connected by means of a conductor 195 to the central contact or terminal of a four-way switch 175. Contacts 121 carried by disc 118 are connected by conductors 122 to the sockets 123 of panel 124. There are as many contacts 121 as are desired and the spacing between contacts represents two inches of the length of the veneer.

The contacts 196 of switch 175 have conductors 197 connected therewith and plugs 129 are connected to conductors 197 and are adapted to be inserted in selected sockets 123 so that relay 191 will be energized at pre-selected intervals when the movable contact 128 engages contacts 121 which are in circuit with switch 175 through conductors 197.

One side of ratchet release solenoid 101 is connected by a conductor 198 to conductor 188, and the other side of solenoid 101 is connected by a conductor 199 to conductor 195. Normally open switch 130 is connected by means of a conductor 200 between conductor 132 and conductor 195 so as to thereby bridge the four-way switch 175 and the selector switch embodied by the contacts 121 and 128.

In the normal automatic operation of the machine, switches 133 and 170 are closed, and with shaft 19 being rotated by the veneer machine through chain 17, magnet 63 will be energized so as to draw armature 77 thereto and rotate shaft 66 therewith. Shaft 66 will only rotate through a partial or substantially complete revolution during each cutoff cycle, and when contact 128 engages a contact 121 which is connected to relay 191 through switch 175, through a plug 129 and conductor 197, relay 191 will be energized, moving armature 190 to a circuit breaking position, de-energizing magnet 63 and permitting armature 77 to be moved endwise by spring 87 to disengaged position.

At the time shaft 66 is rotated, pawl 96 will ride over the teeth of ratchet 94 and when the circuit is completed to relay 191 to de-energize magnet 63, the ratchet release circuit embodying conductors 198 and 199 will be closed so that ratchet release solenoid 101 will be energized and pawl 96 will be released. Release of pawl 96 will permit spring 112 to rotate arm 125 back to its starting position.

At the time the circuit is closed to four-way switch 175, relay 179 will be energized so as to draw armature 180 to circuit closing position with contact 181 in order to energize clutch 160. Relay 179 is a relatively slow releasing relay which will permit clutch 160 to be operative for a short period sufficient to provide for operation of the knife 157, after which armature 180 will move to circuit closing position with respect to the brake circuit embodied in conductors 165, 186, 183 and 182.

In the event there is a bad spot in the veneer which it is desired to cut out, bridging switch 130 is manually closed, thereby energizing relay 191 and relay 179. The switch 130 is operated at least twice in the cutting out of the bad spot and when the bad spot has been cut out, switch 130 is released, thereby breaking the shunt or bridging circuit and permitting the automatic operation of the machine to continue as hereinbefore described.

It will, of course, be understood that when switch 130 is closed, breaking the circuit to magnet 63 through relay 191, the ratchet release circuit to solenoid 101 will be closed in order that contact 128 carried by arm 125 will be returned to its starting position. In other words, the manual operation of switch 130 will effect the same operation of the control as the automatic operation of the control.

Thus, while prior art devices can be used to cut out defective short lengths or portions of veneer, this necessitates the operator's leaving his post where he is occupied in the work of inspection and constantly operating the buttons or pressing down knobs for cutting off each successive length of veneer. On the other hand, with the instant invention all he has to do is to operate the four-way switch 175 and insert the plugs in the desired sockets according to the length or lengths selected to be cut and turn on the machine by means of the switch 133 and when it is desired to cut out a defective short length such as four or six inches, to close the switch 130 which throws the control device of this invention out or off and effects a cutting operation or two in succession if the next regular cutting point is not sufficiently near or at the proper point to eliminate the defective material. After the defect is eliminated by cutting out a short length, the device resumes its automatic operation immediately without any further adjustment and continues to automatically sever or cut the veneer in uniform or regular lengths without requiring any attention whatsoever on the part of the operator and measuring the lengths by closing the circuit to the knife operating clutch at the top contact 121 when engaged by the contact 128 of the movable contact or arm 125 and the next one, when the contact 128 engages the contact 121 of the socket 123 in which a jack plug 129 has been inserted and others in succession according to the lengths selected by insertion of the respective plugs 129 in the sockets 123. When the contact arm 125 is at the first contact 121, the circuit is closed to the knife operating clutch at the electro-magnet thereof, when clipper knife 157 is dropped and then the current is distributed by the timing disc to the electro-magnet of brake 161 to check rotation always with knife 157 in a raised position and in multiples of two inches and corresponding lengths of veneer moved to and past the clipper. Rotation of the arm 125 is caused by distribution of current to the electro-magnet 58 from the slip rings 42 and 43 through the brushes 45 to energize the magnet and attract the armature or clutch plate 77 against the spring 87 to drive shaft 66 from shaft 19 being constantly driven by its drive connection at the proper gear ratio from the shaft S of the main machine or clipper thereof. Then when the arm 125 rotating counterclockwise reaches the next connected contact 121, that is, the next one connected to the next numbered socket 123, the shaft 66 having rotated, the electro-magnetic clutch is rendered inoperative by deenergization of the magnet 58 to release the clutch plate 77, and torsional spring 112 having been wound, this spring will cause reverse rotation of driven shaft 66 when thus disconnected from the constantly rotating shaft 19, thereby returning the arm 125 to its original position by clockwise rotation, being thrown back by the torsional spring to the first contact point. During the initial rotation, the small solenoid or electro-magnet 101 being energized, the core or armature 104 and plunger 108 will be shifted to disengage the pawl 96 from the ratchet wheel 94 to permit free rotation. Upon deenergization of solenoid 101, the core or armature and plunger will be retracted to cause pawl 96 to engage the teeth of ratchet wheel 94, thereby preventing rebound or bouncing as would be caused by an arm merely striking an abutment or stop, thus preventing two quick cuttings in succession and wasting of an inch or two of veneer.

When the contact arm is at the first contact point 121, the main machine is caused to drop its cutting knife 157, the magnetic clutch 160 is energized, the shaft 66 is rotated and the contact arm 125 starts its counterclockwise rotation and immediately when it leaves the first contact, the knife 157 of the main machine or clipper is released; rotation continues until the desired and selected contact point 121 is reached. When this point is reached, i. e., the 16th point for a 32 inch length to be cut, or otherwise, the magnetic clutch 160 is deenergized, with the result that the contact arm 125 is thrown back by the torsional spring 112 to the first contact 121, when another cutting occurs and the process is repeated.

Therefore, the operator is freed for the work of inspection and elimination of defective portions of the strip or sheet of veneer or other material, such as where a knot or hole occurs, say from 4 to 6 inches thereof, and even if some lengths are shorter, they are acceptable and may be used. After each such cutting, the present device is ready to take up and resume its automatic cutting of uniform or regular lengths, or irregular lengths may be cut as desired. The result is automatic operation of repeated intermittent cutting, better output without defects, the elimination of some of the tedium of manual operation and the output substantially increased. The device is sturdy, not likely to get out of working order and may be economically produced, in addition to embodying but few moving parts, and those likely to need attention or replacement, are small, simple and easily accessible.

I claim:

1. In a control means and time and space measuring device for a clipper for veneer or like strip material having strip advancing means suitably driven, a clipping knife movable to and from cutting position, electro-magnetic clutch means for operatively connecting the clipper to the driving means to operate the knife to sever the strip, electro-magnetic brake means for momentarily stopping the knife after each cut in inoperative position, manually operated means for selecting the length of material to be cut and causing the operation of said knife when such length has advanced to the knife, means to render the latter means inoperative, automatic electrically operated control means driven from the strip advancing means to cause intermittent operation of the clutch, knife and brake means independently of the manual means to successively cut the strip in predetermined lengths, and means for adjusting and setting the automatic control means to vary the lengths cut.

2. In a control means and time and space measuring device for a clipper for veneer or like strip material having strip advancing means suitably driven, a clipping knife movable to and from cutting position, electro-magnetic clutch means for operatively connecting the clipper to the driving means to operate the knife to sever the strip, electro-magnetic brake means for momentarily stopping the knife after each cut in inoperative position, manually operated means for selecting the length of material to be cut and causing the operation of said knife when such length has advanced to the knife, automatic electrically operated control means driven from the strip advancing means to cause intermittent operation of the clutch, knife and brake means independently of the manual means to successively cut the strip in predetermined lengths, said latter means including a shaft driven at a predetermined speed ratio from the strip advancing means, a second shaft adjacent the first shaft, electro-magnetic clutch means for intermittently connecting the shafts to drive the second shaft, means operated by the second shaft when driven to render the clutch, knife and brake means operative to automatically repeat the cutting of the strip in predetermined lengths and disconnect the second shaft after each cut, and means to set the automatic control means to vary the operation of the control means and cutting for different predetermined advance of the strip before cutting thereof in different uniform lengths.

3. In a control means and time and space measuring device for a clipper for veneer or like strip material having strip advancing means suitably driven, a clipping knife movable to and from cutting position, electro-magnetic clutch means for operatively connecting the clipper to the driving means to operate the knife to sever the strip, electro-magnetic brake means for momentarily stopping the knife after each cut in inoperative position, manually operated means for selecting the length of material to be cut and causing the operation of said knife when such length has advanced to the knife, automatic electrically operated control means driven from the strip advancing means to cause intermittent operation of the clutch, knife and brake means independently of the manual means to successively cut the strip in predetermined lengths, said latter means including a shaft driven at a predetermined speed ratio from the strip advancing means, a second shaft in spaced end to end relation with the first shaft, an electro-magnet on the adjacent end of the first shaft, a clutch plate on the adjacent end of the second shaft and normally spaced therefrom to be attracted by the magnet upon energization of the electro-magnet, an electrical circuit including a source of energy, a selector board having switches for various positions according to lengths of material to be cut to connect the circuit to said source, a plurality of contacts connected one to each switch connection of the board, a contact movable with the second shaft over the plurality of contacts and operative upon engaging selected connected contacts to energize the first magnetic clutch to operate the knife at such points and successively energize the brake means to momentarily stop the knife automatically and repeatedly after successive predetermined lengths of strip advance past the knife, to cut such lengths of strip, means to deenergize the electro-magnet of the first shaft after each cut and successive cut, to release the clutch plate and second shaft whereby the same is no longer driven from the first shaft, means to return the movable contact to starting position upon release of the clutch plate and second shaft, and a switch in the circuit to render the automatic control means inoperative at times whereby the same may be adjusted for cutting different selected uniform lengths of strip as advanced and for operation of the manual means to operate the knife successively to cut out short defective lengths of strip different from said predetermined lengths.

RUDOLPH S. BURNETT.

References Cited in the file of this patent

UNITED STATES PATENTS

| Number | Name | Date |
| --- | --- | --- |
| 1,727,307 | Robinson | Sept. 3, 1929 |
| 1,753,967 | Robinson | Apr. 8, 1930 |
| 1,947,591 | Guhloff | Feb. 20, 1934 |
| 2,369,253 | Robinson | Feb. 13, 1945 |
| 2,394,558 | Miller | Feb. 12, 1946 |
| 2,583,051 | Haumann | Jan. 22, 1952 |